Jan. 6, 1970 HIKARU NAGANUMA 3,488,137
INFRARED GAS BURNER WITH FLASHBACK PREVENTION ARRANGEMENT
Filed Oct. 17, 1968

HIKARU NAGANUMA
INVENTOR.

BY George B. Griswold

ATTORNEY

United States Patent Office 3,488,137
Patented Jan. 6, 1970

3,488,137
INFRARED GAS BURNER WITH FLASHBACK PREVENTION ARRANGEMENT
Hikaru Naganuma, 335 Kawabata-dori Jigyo, Hagashi-machi, Fukuoka-shi, Fukuoka-ken, Japan
Continuation-in-part of application Ser. No. 634,281, Apr. 27, 1967. This application Oct. 17, 1968, Ser. No. 768,246
Int. Cl. F23c 5/20
U.S. Cl. 431—329                           1 Claim

ABSTRACT OF THE DISCLOSURE

A gas burner which can radiate infrared rays and produce flat flames, comprising a gas chamber surrounded by a casing, a heating plate made of a refractory insulating material disposed over said gas chamber, said heating plate being provided with a number of small apertures therethrough, and a net of approximately 20-mesh mounted over said heating plate in such a manner as to cover the entire surface of the heating plate, and separated therefrom by a gap of about 0.5 mm. With this construction, a gas mixture passes through said small apertures to be finely divided by the meshes of said net and is combusted while producing flat flames over the upper surface of the net and whereby flashback is eliminated by said gap.

---

This application is a continuation-in-part of U.S. patent application Ser. No. 634,281, filed Apr. 27, 1967 and now abandoned.

The present invention relates to gas burners, and more particularly to an infrared gas burner which can radiate infrared rays with flat flames and without flash back.

As first demonstrated in the Schwank U.S. Patent No. 2,775,294, infrared heat is desired rather than large flames. The infrared heat should be in the form of flat flames. However, small flames are dangerous since a small gust of wind will blow out the flames and cause flashback.

According to the present invention, there is provided a gas burner which can radiate infrared rays and produce flat flames and which comprises a gas chamber surrounded by a casing, a heating plate made of a refractory insulating material disposed over said gas chamber, said heating plate being provided with a number of small apertures therethrough and a net of approximately 20-mesh mounted so that it is separated from the upper side of said heating plate by a small gap and disposed in such a manner as to rest over the entire surface of the heating plate but separated therefrom by said small gap so that a gas mixture passes through the small apertures to be finely divided by the meshes of the net while producing flat flames over the upper surface of the net. If a gust of wind blows on the flames they retreat below the net and are not extinguished and do not cause a flashback.

The invention will be described in greater detail with respect to an embodiment thereof as shown in the accompanying drawings, in which.

Figure 1:
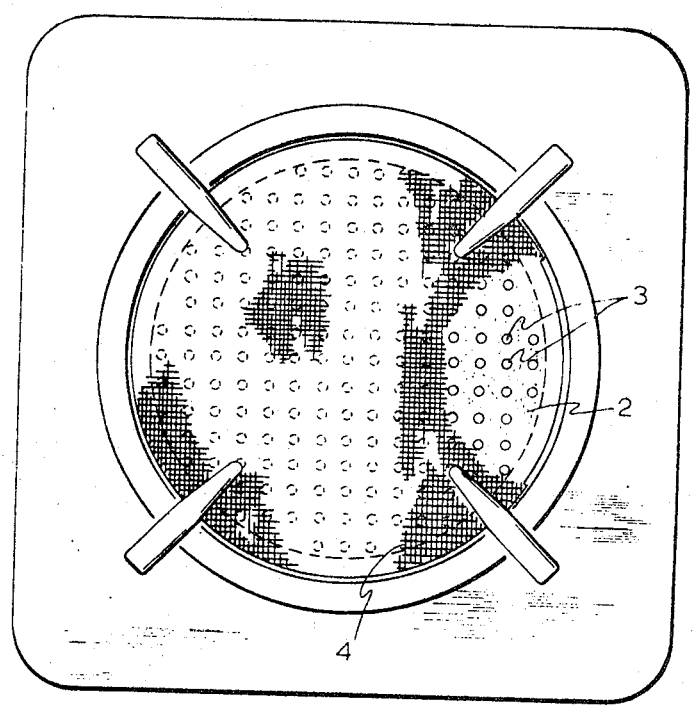
FIG. 1 is a partially broken away plan view showing the gas burner according to the present invention.
Figure 2:
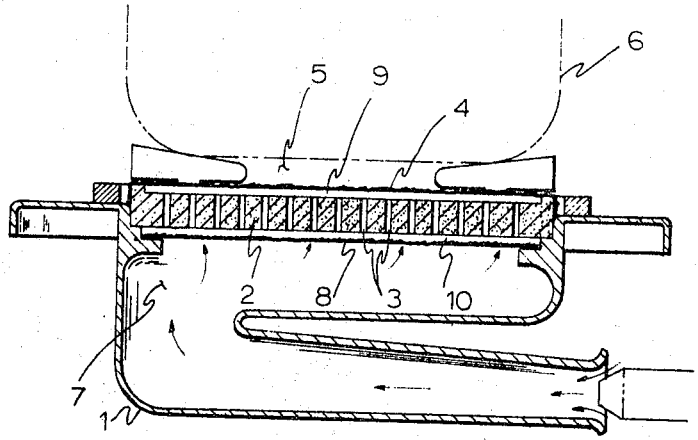
FIG. 2 is a vertical cross-sectional view thereof.
Figure 3:
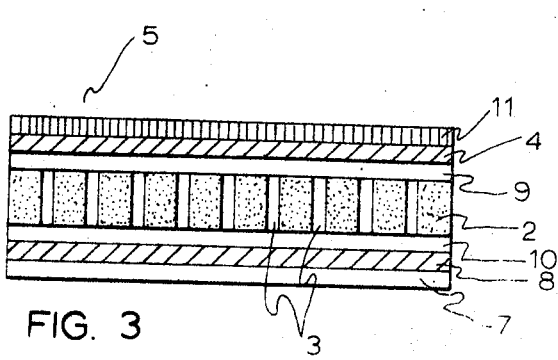
FIG. 3 is an enlarged view of a portion of the burner section.

The gas burner shown in the drawings is provided with a casing 1 defining a gas chamber 7, which is filled with a gas passing thereinto through a nozzle, a primary air inlet and a mixing pipe of the prior art. The heating plate 2 is made of a refractory insulating material, i.e., a porous ceramic plate 15 mm. thick and is mounted on the casing 1. The heating plate 2 is formed with a number of small apertures 3 therethrough. These small apertures 3 are about 2.5 mm. in diameter and spaced about 5 mm. apart from each other. These small apertures are arranged in such a manner as to uniformly distribute the gas from the gas chamber 7. A wire mesh net 4 is disposed over the upper surface of the heating plate 2 and substantially covers the whole area thereof. The space or gap between the heating plate 2 and the net 4 is 0.5 mm. and the importance of this gap will be herein described in greater detail. The net 4 is of fine mesh, approximately 20-mesh and made of a refractory metal net. The net 4 is separate by about 10 mm. from the bottom of an object, e.g., a kettle 6 which is to be heated, by a space 5. Below the heating plate 2 is another wire net 8 very similar or the same as wire net 4 and separated from the bottom of the heating plate also by a gap 10 of 0.5 mm. in a manner similar to net 4 separated by gap 9.

A gas mixture which has passed through the small apertures 3 and the net 4 is finely divided by the sufficiently small meshes of the net and uniformly dispersed over the upper surface of the net. Upon ignition, the gas is combusted over the upper surface of the net 4 to produce flat flames. These flames take a flat shape formed along the surface of the net 4, which results in effective heating of the object 6 to be heated. Also, the heating plate 2 serves to effectively assist in the heating through its heat reflecting action. Additionally, the net 4 is heated red to a high temperature by the lower surface of the flat layer of flames and radiates infrared rays. As will hereinafter be described, there is provided a gap to prevent flashback below the lower surface of net 4. Flames cannot be produced in this gap and the flames appear only on the upper surface of net 4.

With regard to the gap between the heating plate and the net, the distance of 0.5 mm. is critical. This is because of the fact that the arrangement for eliminating spark-discharge across two electrodes by having a gap between the electrodes can also be applied also to a flame of explosive gas. Accordingly, the present gas burner is provided with a gap capable of eliminating flash-back.

It is well known that if the two parallel electrode plates are placed at a distance of about 0.3–0.1 mm. spark-discharge which occurred in the gap between the plates can be eliminated. Examples of the devices, in which such characteristic of the gap against spark-discharge is used, are high-frequency electric furance, medical diathermy, etc. In the present device, the two electrodes are substituted by two porous plates, i.e., wire net and porous ceramic plate. However, the distance between the two plates is critical. The applicant has found that the gap should be about 0.5 mm. in width. In the embodiment shown in the drawing, a wire net and a porous ceramic heating plate are used. The distance between the two plates is 0.5 mm.

The present burner is one which uses only the primary suction air an dneeds no secondary air. As a result, a layer of flat flame in height of about 0.5 mm. is formed on the upper surface of the net. If there is overheating or wind blowing, the flame may back under the net, namely into the gap. And in the present device, the back flame is instantaneoulsy eliminated by the characteristic action of the gaps as mentioned above. As soon as the wind blowing is stopped, a layer of flat flame comes back on top of the net.

The width of the gap is critical. The gap should be 0.5 mm. Another important factor is the mesh size of net. The best result can be obtained when a net of 20 mesh is used. When the net is more coarse, for example, such as 10 mesh or less, the flash-back occurs often and easily. On the other hand, if the net is very fine, for eaxmple, such as 30 mesh or more, the resistance against the gas flow is increased and less amount of the primary air is introduced to be mixed. As the result, a greater amount of carbon monoxide is formed, which is very dangerous for household. Moreover, the diameter of wire which forms a fine net is to be small and accordingly weak.

Although with the net above the plate separated by the gap described of 0.5 mm., flashback is usually eliminated, it sometimes happens that with a very strong wind, there is a slight possibility of flashback. To absolutely prevent such remote possibility of flashback, the second flat layer wire net 8 also of 20 mesh and also separated from the bottom of plate 4 by a gap 10 of 0.5 mm. in width is provided.

It is to be observed that the expression 20-mesh is defined in John H. Perry Chemical Engineers Handbook, McGraw-Hill (1963).

I claim:
1. A gas burner which can radiate infrared rays and produce flat flames, comprising a gas chamber surrounded by a casing, a heating plate made of a refractory insulating material disposed over said gas chamber, said heating plate being provided with a number of small apertures therethrough, a first net of approximately 20-mesh mounted over said heating plate in such a manner as to cover the entire surface of the heating plate and separated therefrom by a gap of 0.5 mm.; a second net of approximately 20-mesh arranged under the heating plate and separated therefrom by a gap of 0.5 mm. from the under side of the plate, so that a gas mixture passes through said small apertures to be finely divided by the meshes of said first net and is combusted while producing flat flames over the upper surface of the net and whereby flashback is eliminated by said gap.

References Cited

UNITED STATES PATENTS

| | | | |
|---|---|---|---|
| 3,185,461 | 5/1965 | Fugassi | 431—329 |
| 3,199,573 | 8/1965 | Flynn | 431—329 |

EDWARD G. FAVORS, Primary Examiner